(12) United States Patent
Chabanne et al.

(10) Patent No.: US 7,134,724 B2
(45) Date of Patent: Nov. 14, 2006

(54) ROTATION MECHANISM FOR SEQUENTIAL ANGULAR VARIATION OF A BACKREST

(75) Inventors: Jean-Pierre Chabanne, Champvallon (FR); Eric Gagnaire, Savigneux (FR)

(73) Assignee: Grupo Antolin-Ingenieria, S.A., Burgos (ES)

( * ) Notice: Subject to any disclaimer, the term of this patent is extended or adjusted under 35 U.S.C. 154(b) by 0 days.

(21) Appl. No.: 10/948,222

(22) Filed: Sep. 24, 2004

(65) Prior Publication Data
US 2005/0116521 A1 Jun. 2, 2005

(30) Foreign Application Priority Data
Sep. 25, 2003 (FR) .................................. 03 11254

(51) Int. Cl.
*B60N 2/235* (2006.01)
(52) U.S. Cl. .................................. 297/366; 297/378.12
(58) Field of Classification Search .................. 16/223, 16/235, 239; 297/378.12, 366, 367, 368, 297/369
See application file for complete search history.

(56) References Cited
U.S. PATENT DOCUMENTS

| | | | | |
|---|---|---|---|---|
| 4,314,729 A | * | 2/1982 | Klueting ..................... 297/366 |
| 4,591,207 A | * | 5/1986 | Nithammer et al. ........ 297/366 |
| 4,836,608 A | * | 6/1989 | Sugiyama ................... 297/367 |
| 4,884,845 A | * | 12/1989 | Schmale et al. ............. 297/367 |
| 5,390,980 A | * | 2/1995 | Premji et al. ........... 297/378.12 |
| 6,139,104 A | * | 10/2000 | Brewer ....................... 297/353 |
| 6,139,105 A | * | 10/2000 | Morgos et al. ........ 297/378.12 |

\* cited by examiner

*Primary Examiner*—Milton Nelson, Jr.
(74) *Attorney, Agent, or Firm*—Oliff & Berridge, PLC

(57) ABSTRACT

The adjustment device comprises a toothed quadrant connected to the sitting surface, and a toothed quadrant which is connected to the back and which can be meshed into the toothed quadrant connected to the sitting surface, in a locked configuration of the seat, and can be demeshed from the toothed quadrant connected to the sitting surface, in an unlocked configuration of the seat, making it possible to adjust the angular position of the back with respect to the sitting surface, an element which possesses a stepped quadrant having a first convex surface and at least one second convex surface, each defining an angular sequence, which are connected to one another by a stop surface, a pawl possessing a tooth capable of following each convex surface until it comes to bear against a stop surface, and an element to pivot the pawl in order to release the tooth from a stop surface, so as to cause the seat to change from one angular sequence to the next sequence.

16 Claims, 10 Drawing Sheets

ROTATION MECHANISM FOR SEQUENTIAL ANGULAR VARIATION OF A BACKREST

The present invention comes within the field of seats for motor vehicles and relates to an articulation mechanism between the back and the sitting surface of a seat.

Many motor vehicles of the monospace type are equipped with three rows of seats, called seats of rows one to three, thus making it possible for them to take up to eight passengers on board.

The seats of row one are opposite the front doors of the vehicle and the seats of row two are opposite the rear doors of the vehicle; there is therefore very easy access to these two rows of seats.

By contrast, access to the seats of row three may present some difficulties, since the passengers can take their place on these seats only from the rear doors of the vehicle.

It is therefore desirable that the seats of row two, which to some extent "bar" access to the seats of row three, can temporarily open access to the seats of row three.

Moreover, the seats of row two, like any seat of the vehicle, must offer an adjustment of the inclination of its back for the passenger's comfort.

Finally, these seats must be retractable in order to increase the loading volume of the rear compartment of the vehicle.

It is therefore found that some seats must be capable of being used at angular adjustments corresponding to special uses. These are, in particular, the seats of row two, but also other seats, such as seats of row one in two-door vehicles.

One object of the invention is, therefore, to propose a seat, the back of which can be inclined according to adjustment sequences corresponding to preferred methods of use for the seat.

In a way known per se, the device for adjusting the angular position of an articulated back with respect to a sitting surface of the seat according to at least two predetermined angular sequences comprises:

a toothed quadrant connected to the sitting surface, and a toothed quadrant which is connected to the back and which can be meshed into the toothed quadrant connected to the sitting surface, in a locked configuration of the seat, and can be demeshed from the toothed quadrant connected to the sitting surface, in an unlocked configuration of the seat, making it possible to adjust the angular position of the back with respect to the sitting surface.

According to the invention, it comprises, furthermore:

a ring which possesses a stepped quadrant having a first convex surface and, at least, one second convex surface, each defining an angular sequence, which are connected to one another by means of a stop surface, a pawl possessing a tooth capable of following each convex surface until it comes to bear against a stop surface, and means making it possible to pivot the pawl in order to release the tooth from a stop, so as to cause the seat to change from one angular sequence to the next.

Thus, the basic idea of the present invention involves providing limitations of the angular displacement of the back with respect to the sitting surface according to predetermined sequences which correspond to preferred uses of the seat by a user. These angular sequences are defined by the stop surfaces against which the tooth of the pawl comes to bear. The pivoting of the pawl makes it possible to change from one sequence to the next sequence, since the pivoting of the pawl makes it possible to release the tooth from a stop surface.

In order to ensure the locking of the back with respect to the sitting surface, the device possesses:

a fixed flange connected to the sitting surface of the seat and supporting the toothed quadrant, a moveable flange which is connected to the back and to which are fastened pivotally a plate possessing the toothed quadrant and a collar equipped with a cam coming to bear against the plate in the locked configuration of the seat.

The collar may be equipped with a handle in order to enable a user to adjust the inclination of the seat.

In an especially advantageous embodiment, the element possessing a stepped quadrant consists of a ring possessing:

a first convex surface delimited by two stop surfaces, a second convex surface and a third convex surface connected to the second convex surface by means of a stop surface.

This arrangement of the stepped surfaces makes it possible to define three angular sequences which correspond to three methods of use of the seat. To be precise, when the tooth of the pawl is in contact with the first convex surface, the rotation of the back (in as much as the two toothed quadrants are demeshed) is restricted by the two stop surfaces bordering the first bearing surface. This angular quadrant corresponds to the adjustment of the seat for a comfort position in which the back is inclined rearwards to a greater or lesser extent as a function of the desired inclination of the upper part of the passenger's body.

When the tooth of the pawl is released from a bearing surface, the said tooth follows the second convex surface until it comes into contact with a new bearing surface. This new angular limitation corresponds to a position of the back in which the latter is inclined in the direction of the sitting surface in order to free access to the space to the rear of the seat.

Finally, when the pawl is pivoted once again, the tooth is released from the bearing surface and the back can then be turned down completely in the direction of the sitting surface.

According to a preferred embodiment, the device comprises at least one blade articulated in terms of rotation and comprising a tab capable of coming to bear against the pawl in order to cause the latter to pivot about its axis for the purpose of releasing the tooth from a stop surface.

Furthermore, the pawl possesses a dog against which the tab of the blade comes to bear.

Moreover, the pawl possesses a branch rounded at its end and capable of coming to bear against a rib in the form of an arc of a circle formed on the ring.

According to one possibility, the collar possesses a lug in which a stud is engaged, and the blade possesses a tab capable of coming to bear against the stud in order to cause the collar to pivot into a position in which the cam is opposite a notch formed in the plate.

Moreover, the blade possesses a pin to which a control rod is fastened.

In order to fasten the ring to the fixed flange, the ring possesses a drillhole into which is engaged a boss projecting from the fixed flange.

In one embodiment, the fixed flange and the moveable flange each possess a circular orifice, each orifice being concentric to the axis of rotation of the back with respect to the sitting surface, a bearing being engaged in each of the orifices.

In order to block the fixed flange, the device possesses an orifice via which is engaged a member for fastening to the sitting surface.

According to one possibility, the device comprises a pin which is engaged in the moveable flange and on which the plate and the hook pivot.

In a third embodiment, the means possessing a stepped quadrant is a board possessing a first convex surface, a second convex surface and a stepped third surface which are delimited relative to one another by means of two stop surfaces.

It is noted that the pawl possesses a tab capable of sliding on the convex surface.

Moreover, the moveable flange is prolonged by a horn coming to bear against a stop in the rearwardly inclined position of the back.

To understand it clearly, the invention is described with reference to the accompanying drawing illustrating, by way of non-limiting example, two embodiments of a device for adjusting the angular position of a seat back articulated with respect to a sitting surface according to the latter.

FIG. 1 is an exploded perspective view of a first embodiment,

FIG. 2 is a perspective view of the first embodiment after the removal of the control blade, FIGS. 3, 4 and 5 are perspective views of this embodiment during operation, FIG. 6 is a side view of a second embodiment of the device, FIGS. 7 and 8 are side views of a third embodiment of the device, FIG. 9 is a perspective view of the third embodiment of the device, FIG. 10 illustrates a side view of a seat in several preferred positions.

It should be noted that the components common to the various embodiments have identical references.

The drawing basically illustrates the device for the articulation of the seat back with respect to the sitting surface, with the general structure of the seat being omitted.

The drawing illustrates, however, as regards the sitting surface of the seat, part of a sitting surface profile 2 and also a flange 3 which is connected to the back of the seat.

As on many seats, the adjustment of inclination of the back of the seat with respect to the sitting surface is carried out by means of two elements, one connected to the back and the other to the sitting surface, each having a toothed part, one convex and the other concave.

These two elements can be temporarily moved away from one another so that the toothed parts are demeshed and thus allow the rotation of the back with respect to the sitting surface about the axis of rotation of the seat.

Referring to the drawing, it can be seen that the device therefore possesses a fixed flange 5, which is connected to the sitting surface of the seat, and the moveable flange 3, which is connected to the back.

The fixed flange 5 possesses an orifice 6, through which a bolt or a rivet is engaged in order to ensure the fastening of this flange to the sitting surface profile 2.

The fixed flange 5 possesses a toothed quadrant 7 on its upper edge.

The moveable flange 3 accommodates two elements, to be precise:

a collar 9 possessing a cam 10 and a lug 12 in which a stud 13 is engaged, and a plate 14 possessing a notch 15, the profile of which is complementary to that of the cam 10, a prolongation 11 bordering the notch 15, and a toothed quadrant 16 capable of being meshed into the toothed quadrant 7 of the fixed flange 5.

The collar 9 and the plate 14 are each moveable in terms of rotation with respect to the moveable flange 3. It is noted that the collar 9 is provided on its axis of rotation with a return spring 17.

The collar 9 is also equipped with a handle 18, the manipulation of which makes it possible to rotate the latter.

The return spring 17 acting on the collar 9 tends to lay the cam 10 against the plate 14, in such a way that the toothed quadrants 7 and 16 of the plate 14 and of the flange 5 are meshed.

Due to the action of the collar 9, the back is fixed with respect to the sitting surface. To be precise, the cam 10 of the collar 9, the said cam bearing against the plate 14, prevents any movement of the latter and of the back, since it keeps the toothed quadrants 7 and 16 engaged one in the other.

By contrast, when the collar 9 rotates, for example under the effect of action on the stud 13, the cam 10 is then opposite the notch 15 formed in the plate 14. The plate 14 then rotates under the action of the cam 10 which comes to bear against the prolongation 11. This makes it possible to release the toothed quadrant 16 from that of the fixed plate 5. In this configuration, the back is free in terms of rotation with respect to the sitting surface.

However, it will be understood that the displacement of the back in terms of rotation has no angular limitation. This is therefore impractical for a user who would like to incline the back only slightly forwards so as to have access to a seat of row three, since the back will tend to be turned down forwards completely. This will oblige the user to raise the seat from its lowest position.

To overcome this disadvantage, as can be seen in the drawing, the seat possesses, furthermore, means making it possible to define sequences of angular displacement of the back, these sequences corresponding to preferred requirements of a user.

Thus, referring to FIG. 1, it can be seen that a ring 21 is fastened to the fixed flange 5. This ring 21 possesses a drill hole 23, into which is engaged a boss 24 which projects beyond the fixed flange 5 and which therefore prevents any displacement of the ring 21 with respect to the fixed flange 5.

The ring 21 possesses a stepped upper quadrant. These steps are delimited by a plurality of angular stops.

In the example illustrated in FIG. 2 of the drawing, it can be seen that the ring 21 possesses a first convex surface 26a delimited by two stop surfaces 27a, 27b and a second and a third convex surface bearing respectively the references 26b and 26c which are connected to one another by means of a stop surface 27c.

Another essential element of the device is a pawl 32 which follows the stepped quadrant of the ring 21.

The pawl 32 rotates on a pin 34 which is engaged in the moveable flange 3 and on which the plate 14 is likewise articulated.

It is also noted that the ring 21 is equipped with a rib 29 adjacent to a circular orifice 30 with which it is provided.

The pawl 32 is fastened to the plate 14 by means of a pivot connection allowing its rotation with respect to the plate 14.

As can be seen in the drawing, the pawl 32 possesses a branch equipped with a tooth 35 which comes to bear against the stepped profile of the ring 21, a branch 36 having a rounded end, and a dog 37.

A point which it is important to note with regard to the pawl 32 is that the rounded branch 36 and the dog 37 are each in a plane offset with respect to the plane of the branch equipped with the tooth 35.

Thus, in the stack of components forming the mechanism, the pawl 32 is in the same plane as that of the ring 21, but the rounded branch 36 of the pawl 32 and the dog 37 are each in an offset plane.

It is also noted that the ring 21, the fixed flange 5 and the moveable flange 3 respectively possess a circular orifice 30, 30a, 30b, each orifice being concentric to the axis of rotation Y of the back with respect to the sitting surface, a bearing 45 being engaged in each of the orifices.

The last major component of the device is a control blade 38.

This blade 38 is mounted on the fixed flange 5 by means of a pivot connection utilizing the same axis of rotation as that of the collar 9.

The blade 38 possesses a first tab 39, which comes to bear against the stud 13 of the collar 9, and a second tab 40 longer than the first. Moreover, it can be seen that the blade 38 possesses a pin 42 to which a control rod 41 is fastened.

The functioning of the device will now be described with reference to the figures of the drawing.

FIG. 3 illustrates the device in a configuration in which the seat is in its usual position of use, in which the back is inclined a few degrees with respect to the vertical. This position is illustrated by the letter A in FIG. 7.

Although not apparent in the drawing, the stroke of the rod 41 has indexing, that is to say correspondence between the stroke of the rod 41 and the angular displacement desired by the user. This indexing may take the form of pictograms, opposite which the free end of the control rod 41 is placed.

Should the user wish to incline the back rearwards, he acts on the handle 18.

The rotation of the collar 9 brings the cam 10 opposite the notch 15 formed in the toothed plate. The cam 10 comes to bear against the prolongation 10, thus causing the rotation of the plate 14.

The plate 14 then tilts with respect to its axis, the effect of which is to demesh the toothed quadrant 16 of the plate 14 from that of the fixed flange 5. The back, which is connected to the plate 14 by means of the moveable flange 3, is then freely rotatable.

However, and this is the essential point of the device according to the invention, its rotation is limited angularly.

To be precise, as becomes clearly apparent from FIG. 3, the rotation of the plate 14 (and therefore, ultimately, of the back) is restricted by the tooth 35 of the pawl 32, the said tooth coming to bear against the angular stops 27a, 27b.

It should be noted that the manipulation of the handle 18 acts directly on the collar 9, but in no way acts on the pawl 32. Thus, when a user adjusts the inclination of the back by means of the handle 18, it can act only on the inclination of the back. There is therefore no risk of incorrect operation.

FIG. 3 shows the situation where the back is in its rear end position, since the tooth 35 of the pawl 32 bears against the rear end angular stop.

Should the user wish to incline the back forwards to have access to the space located at the rear of the back, so as to bring it towards a position illustrated by the letter C, he exerts a new pull on the rod 41.

This pull, which induces a stroke greater than that indicated in the previous case, results, as before, in the tab 39 of the blade 38 being brought to bear against the stud 13 of the collar 9, and, by virtue of the same kinematics as those described above, the toothed quadrant 16 of the plate 14 is demeshed from that of the fixed flange 5.

However, the greater stroke of the control rod 41 causes the tab 40 of the blade 38 to come into abutment against the dog 37 of the pawl 32 and causes the latter to rotate. During the rotation of the pawl 32, the tooth 35 is released from the stop surface 27b. This then allows the forward rotation of the toothed plate 14 integral with the moveable flange 3 (and, ultimately, of the back). This rotation is limited by the presence of the angular stop 27c against which the tooth of the pawl comes to bear.

Should the user wish to turn down the back against the sitting surface, he exerts a pull on the rod 41 so that the tab 40 of the blade 38 causes the pawl 32 to rotate through an angle such that the tooth 35 is released from the angular stop 27c.

Nothing then prevents the rotation of the toothed plate 14 and therefore of the back of the seat with respect to the sitting surface.

It is noted that, during this rotation, the pawl 32 is held by a stud 42 projecting from the plate 14 and by its rounded tab 36 which slides against the rib 29 of the ring 21. Thus, when the user releases the control rod, the tab 36 which bears against the rib 29 prevents the return of the plate 14.

By contrast, when the user returns the back to the nominal position, the rounded tab 36 will follow the rib 29 and will make it possible to lock the device as a result of the meshing of the toothing of the plate 14 into the toothing of the fixed flange 5.

Figure 1:
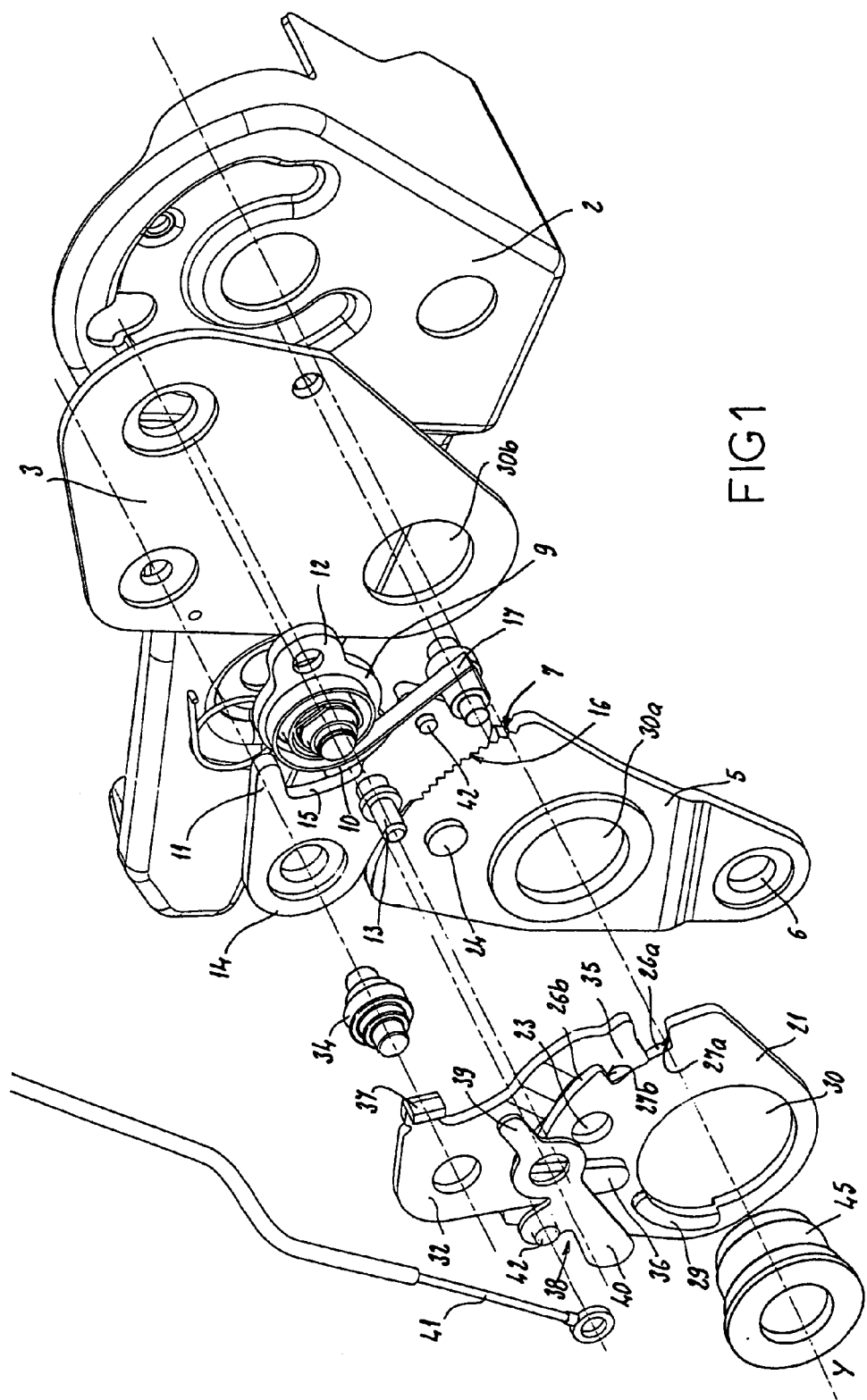
Figure 2:
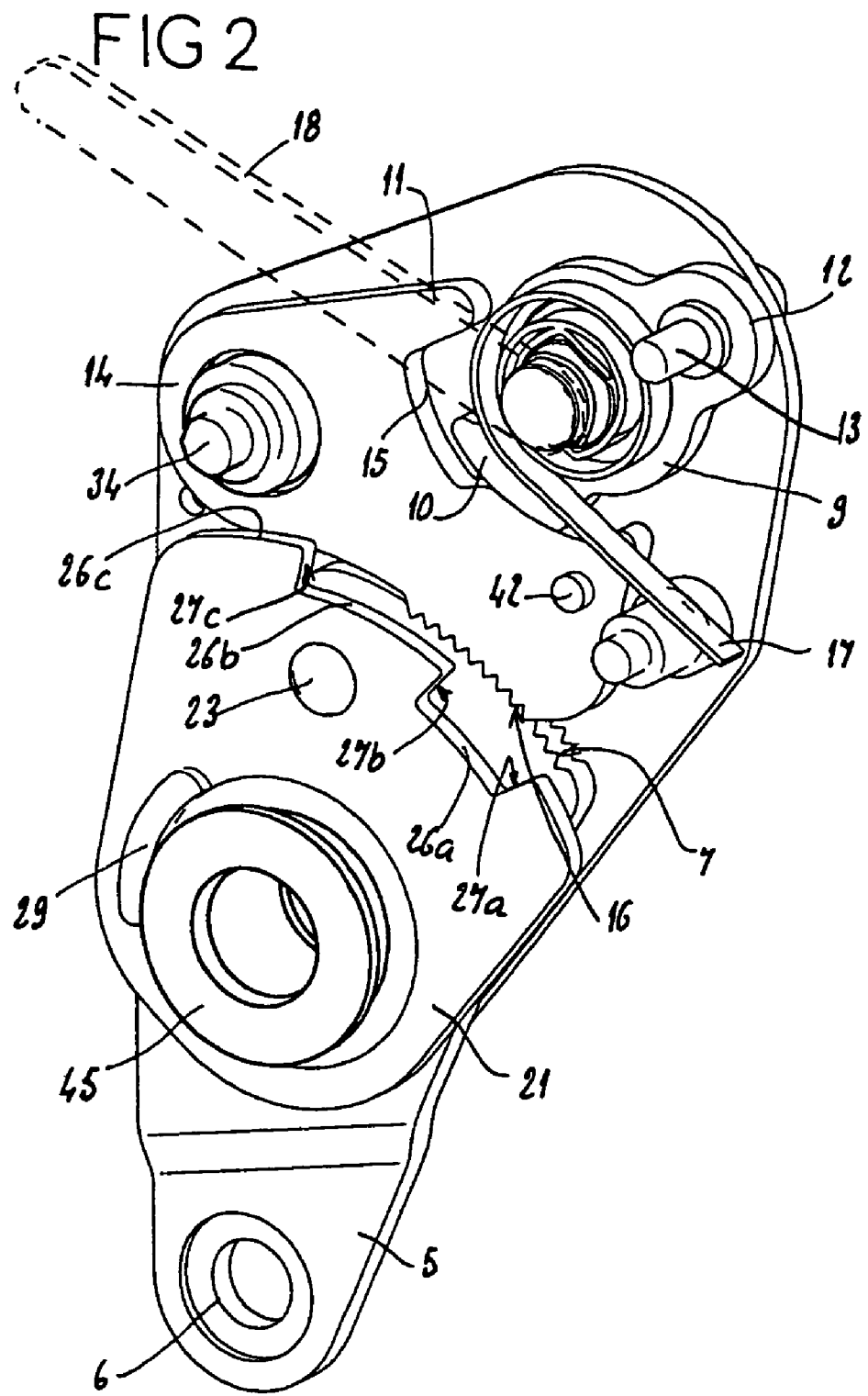
Figure 3:
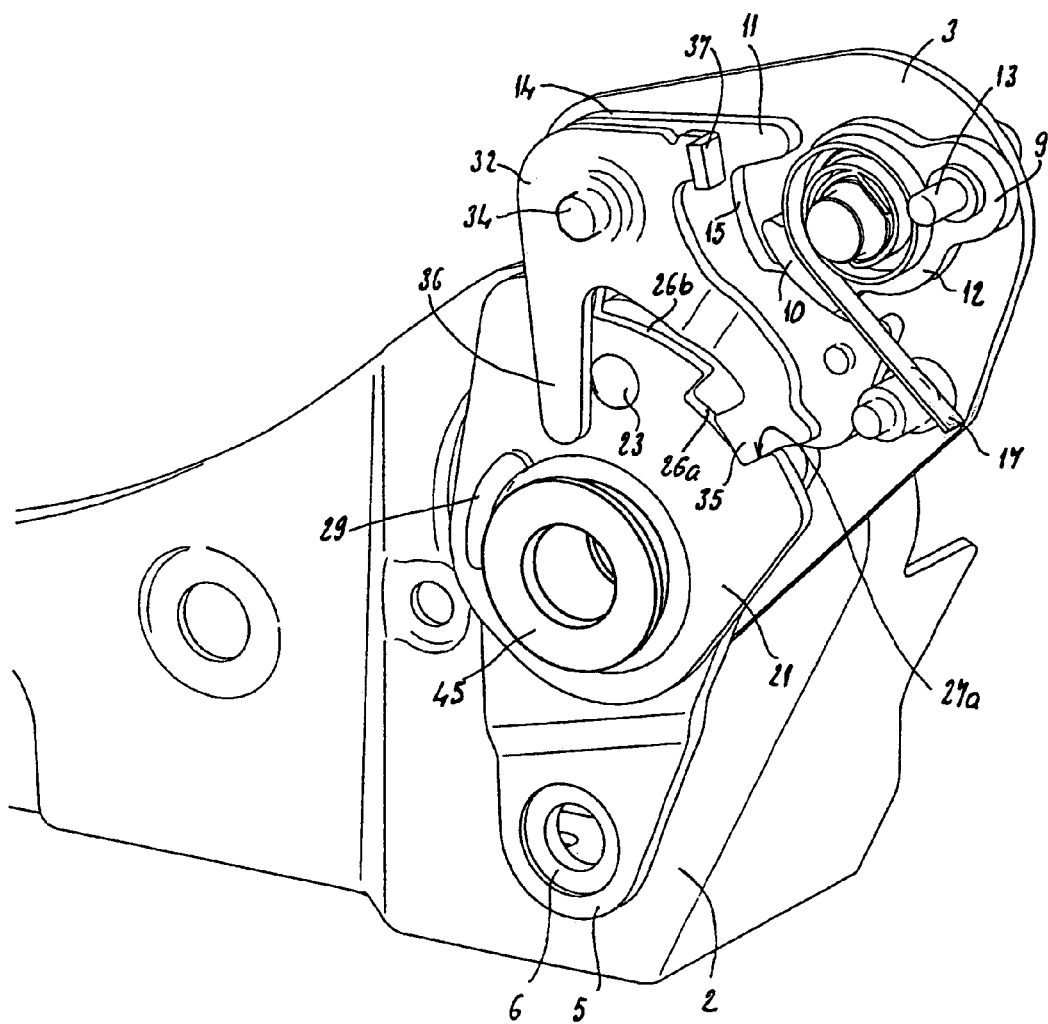
Figure 4:
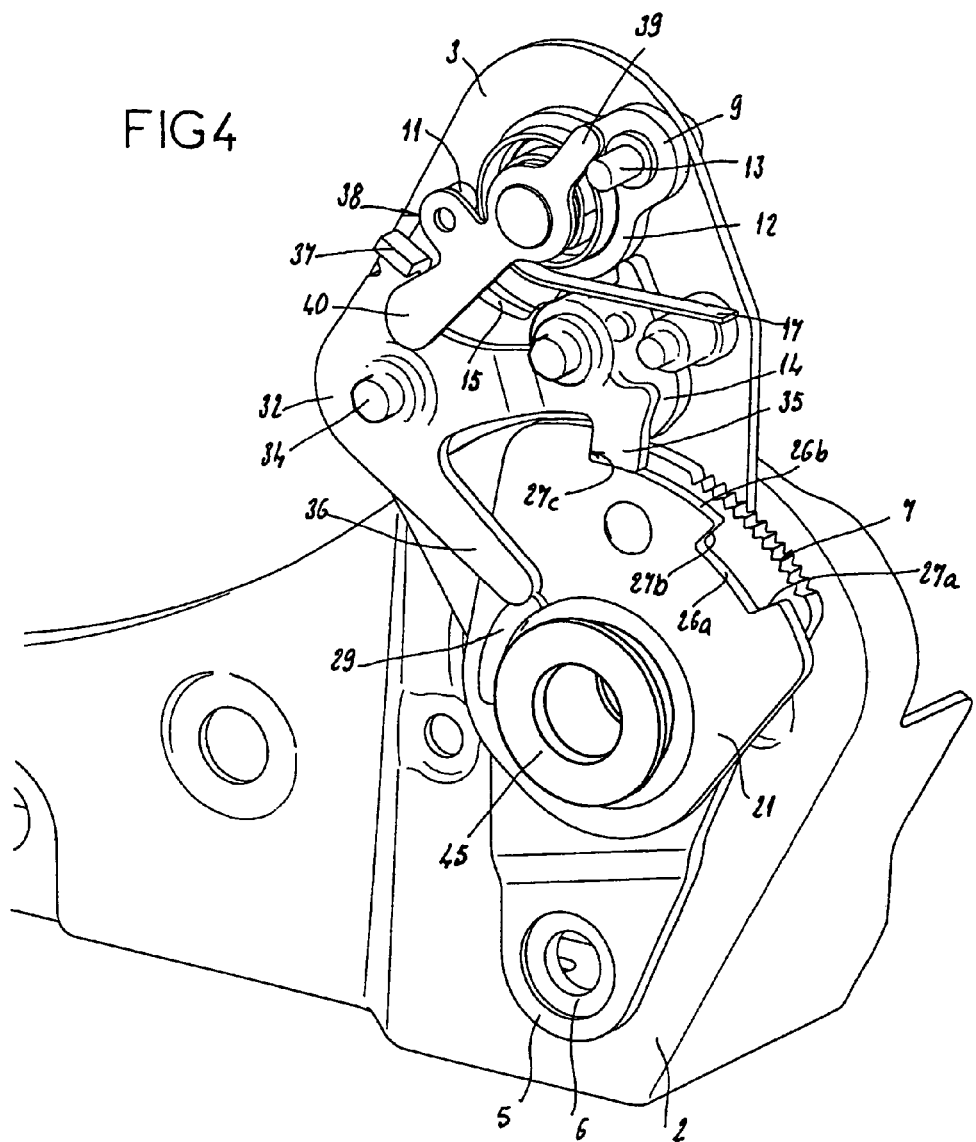
Figure 5:
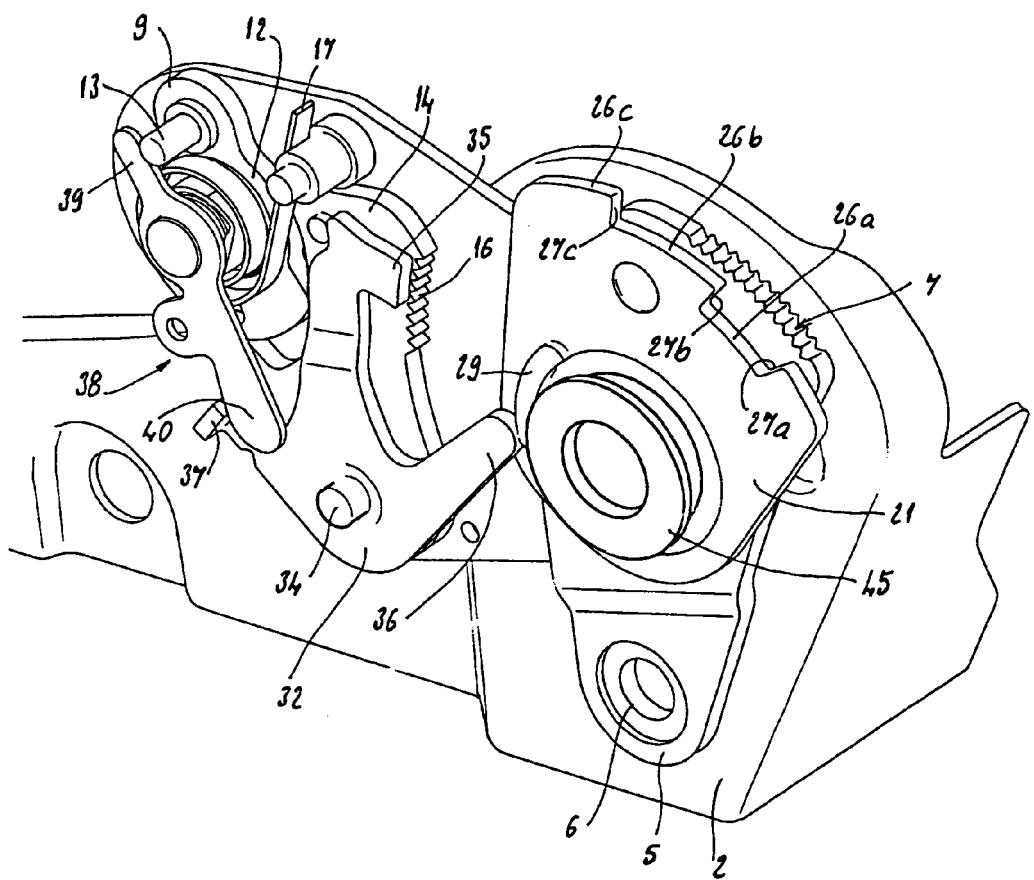
Figure 6:
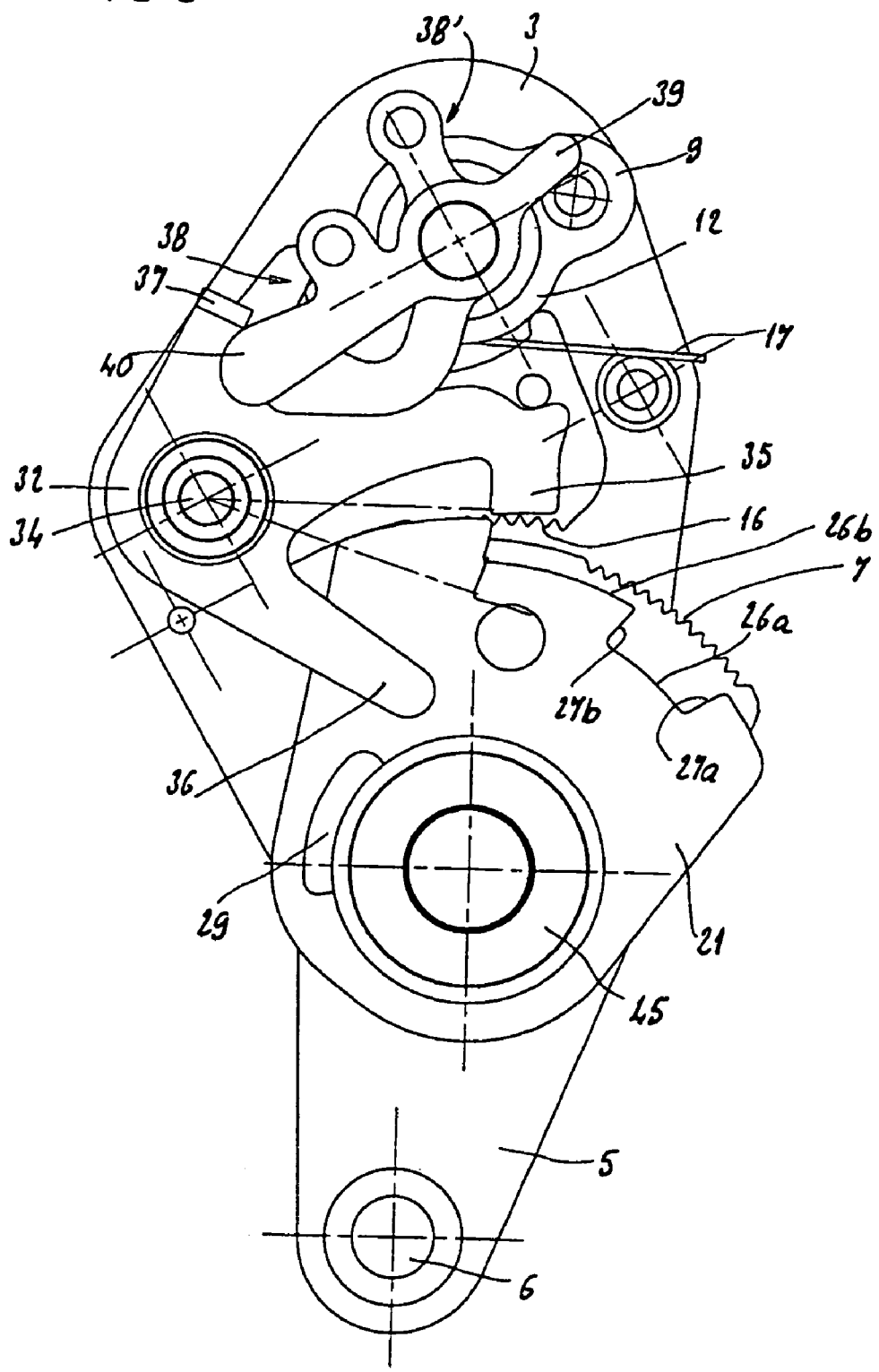
FIG. 6 illustrates an alternative embodiment in which the device is equipped with two blades 38 and 38'. These two blades each have a specific action on the pawl and are controlled by a suitable control rod, the action of which triggers a rotational sequence of the specific back.

In this alternative embodiment, the flange 5 accommodates a board 40. This board 40 is integral with the flange 5. The board 40 possesses a stepped edge consisting of a succession of convex surfaces 41a, 41b, 41c delimited from one another by stop surfaces 42a, 42b.

As regards that part of the device which is connected to the back, the device possesses a flange 3 receiving the collar 9, the latter possessing a cam 10 in a way entirely similar to the above-described variants of the device.

The collar 9, by virtue of its rotation, makes it possible to release the plate 14, the toothing 16 of which is engaged in the toothing 7 of the fixed flange 5.

Figure 7:
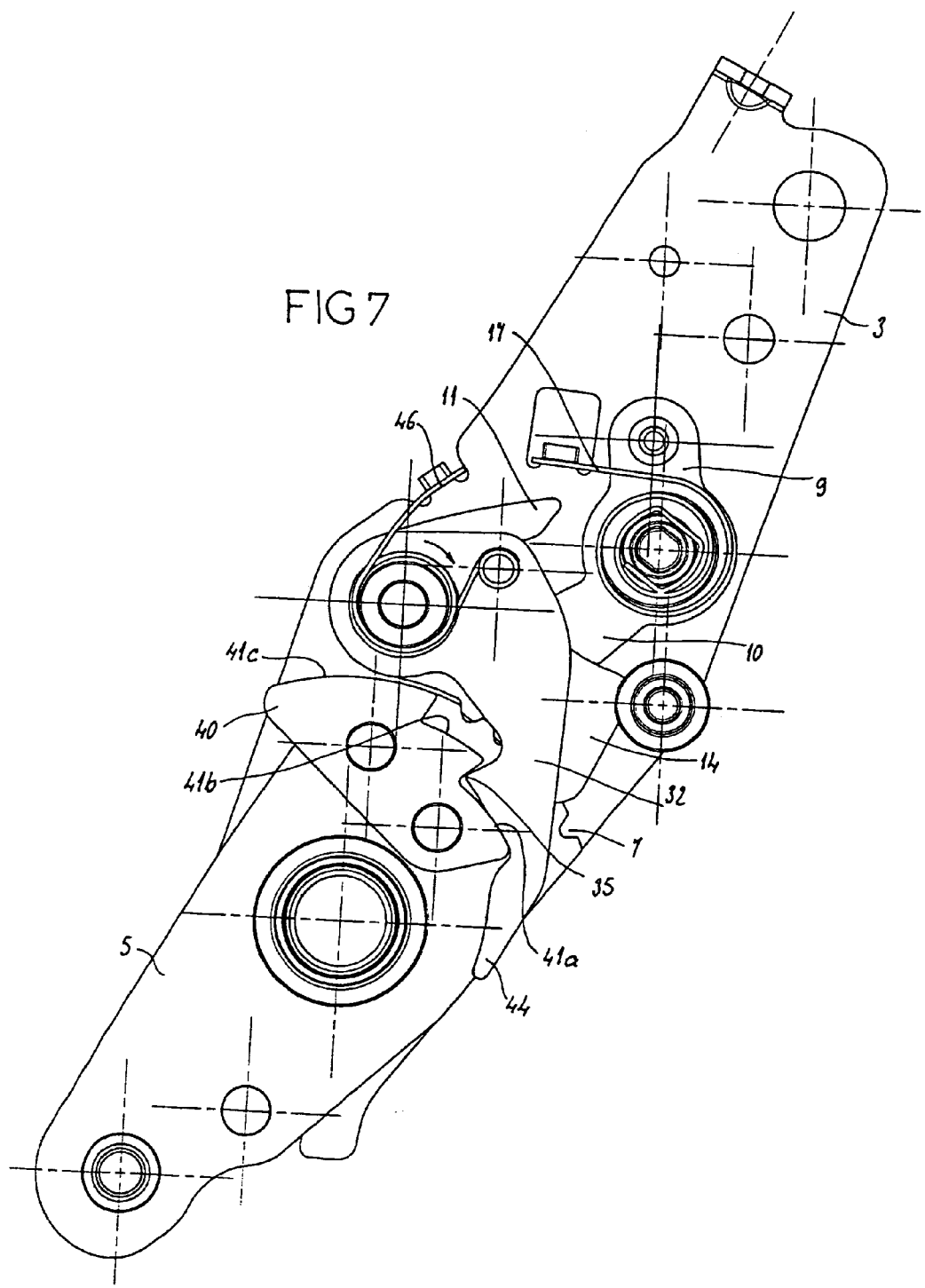
FIGS. 7 to 9 illustrate another alternative embodiment which, whilst possessing the functions of the device according to the invention, comprises a smaller number of components.
Figure 8:
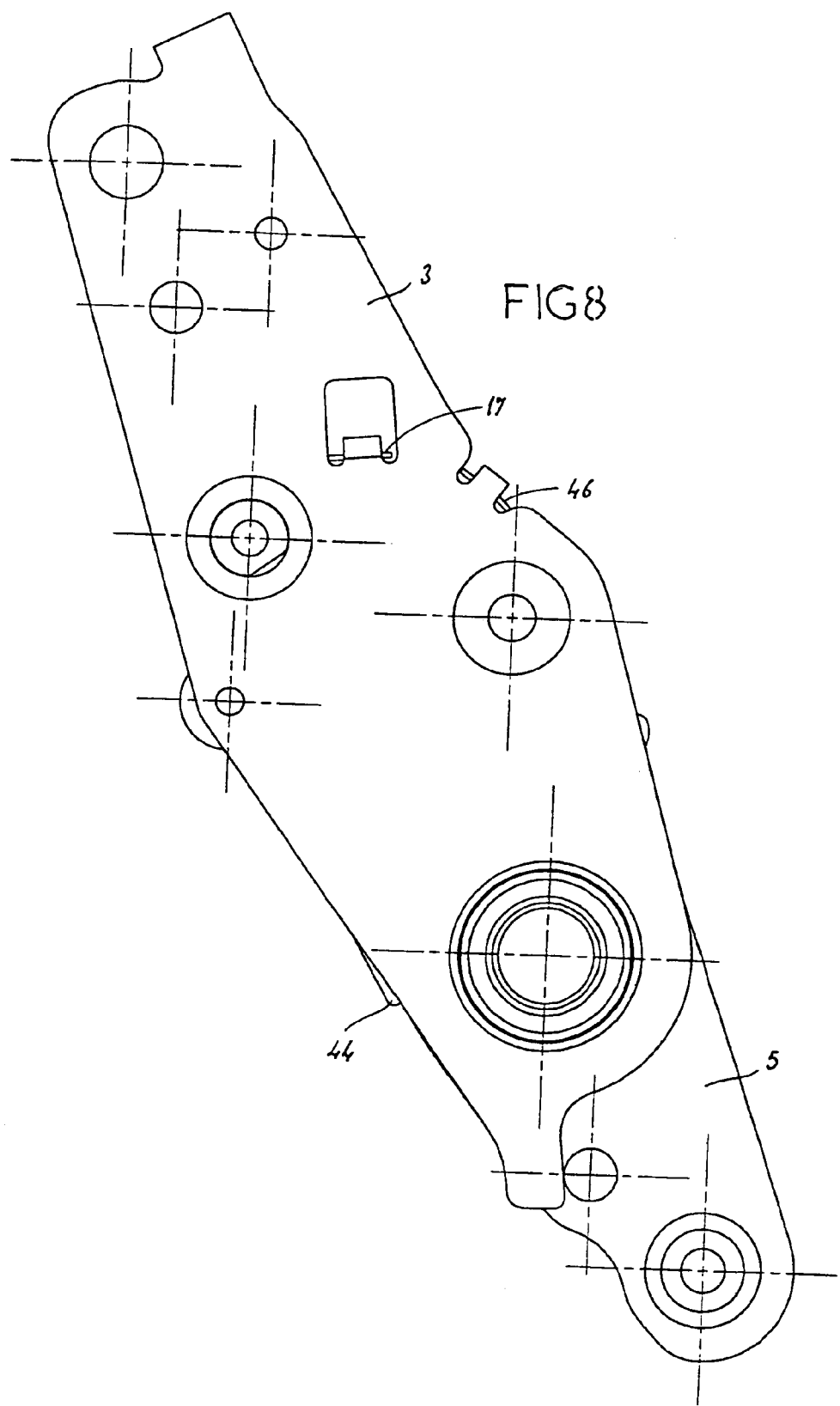
Figure 9:
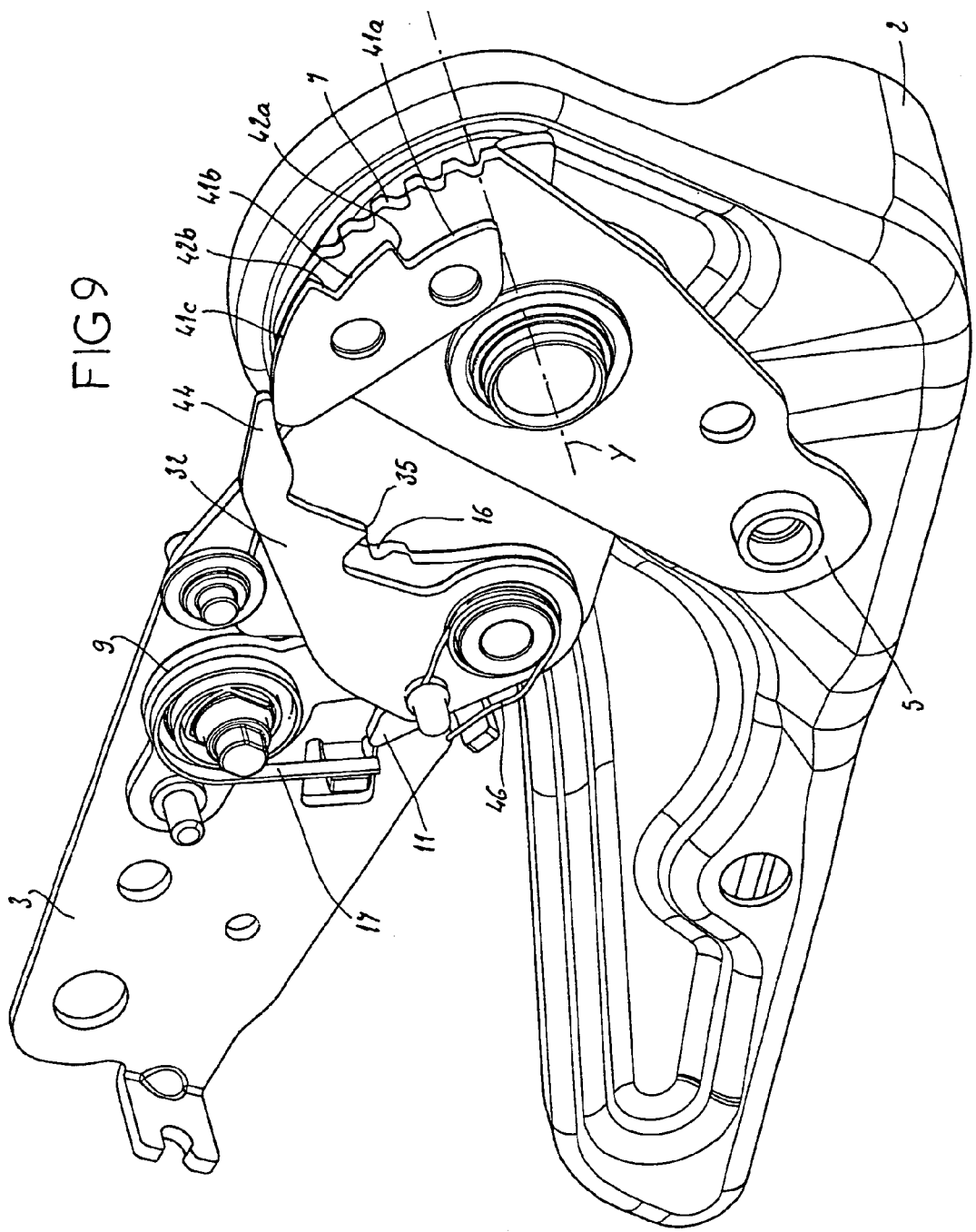

By contrast, in the embodiment of FIGS. 7 to 9, the device differs from the above-described devices in the shape of the pawl 32. The pawl 32 possesses a tooth 35 capable of coming into contact with the bearing surfaces 42a or 42b. It is also noted that the pawl 32 is prolonged by a tab 44. The pawl 32 is mounted pivotally with respect to the flange 3, at the same being engaged on the axis of rotation of the plate 14.

Moreover, the pawl 32 is stressed by a spring 46, the elastic effect of which tends to bring it to bear on the stepped surfaces of the board 40. This spring 46 makes it possible to compensate the effects of gravity and to limit the noise problem.

Another characteristic which it is appropriate to specify with regard to this alternative embodiment is the presence, on the other face of the device, the said other face being illustrated in FIG. 8, of a horn 48 which prolongs the flange 3. As can be seen in FIG. 8, the flange 3 is stopped in terms of rotation by its horn 48 which comes to bear against a stop 49 projecting from the surface of the fixed flange 5. The rearward rotation of the flange 3 and therefore of the back of the seat is thus stopped.

The functioning of the device in this alternative embodiment is similar to that described above inasmuch as a first action on the collar 9 for the purpose of causing the latter to pivot makes it possible to place the cam 10 opposite the notch 15 formed in the plate 14. With the rotation being continued, the cam 10 comes into contact with the prolongation 11.

In this position, the plate 14 is no longer blocked in terms of rotation and the action of the cam 10 on the prolongation 11 of the plate 14 causes the pawl 32/plate 14 assembly to tilt. The toothings 16 and 7 of the plate 14 and of the flange 5 respectively are then disengaged, thus making it possible then to cause the back to tilt forwards. However, this rotation is interrupted by the tooth 35 coming into contact with the bearing surface 42b.

If the user then continues the rotation which he exerts on the collar 9, the cam 10 then pushes the prolongation 11 further forwards, the effect of which is to cause the plate 14/pawl 32 assembly to tilt, the tooth 35 then escaping from the bearing surface 42b. There is then no longer any obstacle to the rotation of the flange 3 and therefore of the back of the seat which can tilt completely forwards.

Figure 10:
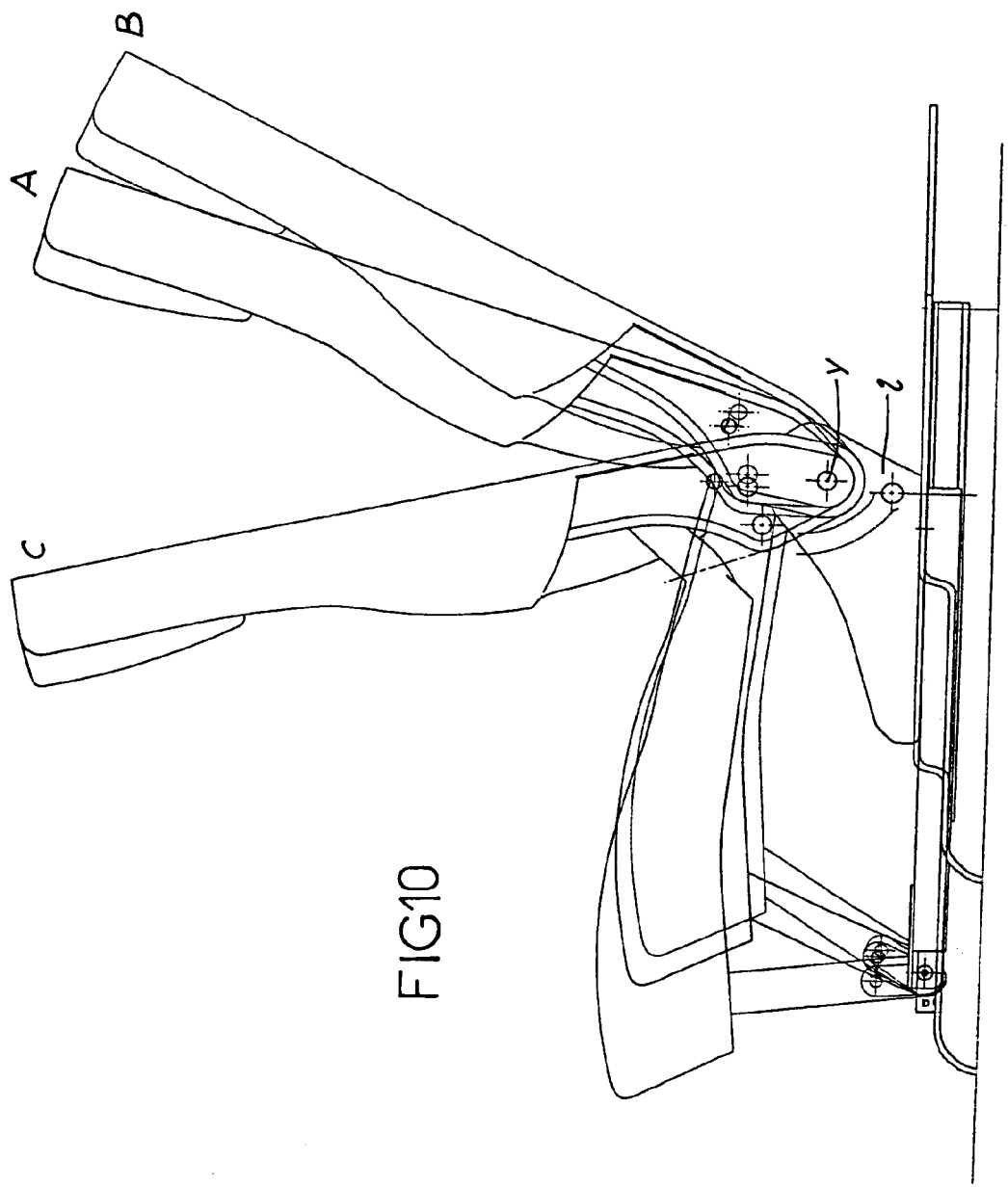

FIG. 9 illustrates the device in this configuration. It is noted, in this figure, that the tab 44 of the pawl follows the convex surface 41c of the board 40, with the result that, when the user wishes to replace the back in its normal position of use illustrated by the letter A in FIG. 10, the pawl 32 will follow the board 40 during its rotation and will then be reengaged against the bearing surface 42a or 42b. As regards the rearward rotation of the back, this will be stopped when the horn 48 comes into abutment against the stud 49.

The invention thus provides a seat articulation device making it possible to define inclination segments of the back which correspond to the requirements of a user, in particular the inclination of the back towards the front of the back via an access to the space at the rear of the back or the complete retraction of the seat.

It goes without saying that the invention is not limited to the embodiment described above by way of non-limiting example, but that, on the contrary, it embraces all its embodiments.

The invention claimed is:

1. A device for adjusting an angular position of an articulated back with respect to a sitting surface of a seat according to at least two predetermined sequences, the device comprising:
   a first toothed quadrant adapted to be connected to the sitting surface;
   a second toothed quadrant which is adapted to be connected to the back and is meshed into the first toothed quadrant adapted to be connected to the sitting surface, in a locked configuration of the seat, and is demeshed from the first toothed quadrant adapted to be connected to the sitting surface, in an unlocked configuration of the seat, to adjust the angular position of the back with respect to the sitting surface;
   an element which possesses a stepped quadrant having a first convex surface and at least one second convex surface, each defining an angular sequence, which are connected to one another by at least one stop surface;
   a pawl possessing a tooth capable of following each convex surface until it comes to bear against the at least one stop surface; and
   means for pivoting the pawl to release the tooth from the at least one stop surface, so as to cause the seat to change from one angular sequence to the next sequence.

2. The device according to claim 1, further comprising:
   a fixed flange that is adapted to be connected to the sitting surface of the seat and supports the first toothed quadrant;
   a moveable flange which is adapted to be connected to the back and to which are fastened pivotally a plate possessing the second toothed quadrant and a collar equipped with a cam coming to bear against the plate in the locked configuration of the seat.

3. The device according to claim 2, wherein the collar is equipped with a handle.

4. The device according to claim 3, wherein the pawl possesses a branch rounded at its end and capable of coming to bear against a rib in the form of an arc of a circle formed on the element.

5. The device according to claim 1, wherein the element that possesses the stepped quadrant includes a ring, the ring comprising:
   the at least one stop surface comprises first, second and third stop surfaces,
   a first convex surface delimited by the first and second stop surfaces, and
   a second convex surface and a third convex surface connected to the second convex surface by the third stop surface.

6. The device according to claim 5, wherein the pawl possesses a dog against which a tab of at least one blade comes to bear.

7. The device according to claim 6, further comprising a pin which is engaged in a moveable flange and on which a plate and the pawl pivot.

8. The device according to claim 6, wherein
   a collar possesses a lug in which a stud is engaged, and
   the blade possesses a tab capable of coming to bear against the stud to cause the collar to pivot into a position in which a cam is opposite a notch formed in a plate.

9. The device according to claim 6, wherein the ring, a fixed flange and a moveable flange each possess a circular orifice, each orifice being adapted to be concentric to the axis of rotation of the back with respect to the sitting surface, a bearing being engaged in each of the orifices.

10. The device according to claim 9, wherein the fixed flange possesses an orifice via which is engaged a member for fastening to the sitting surface of the seat.

11. The device according to claim 5, further comprising at least one blade articulated in terms of rotation and a tab capable of coming to bear against the pawl to cause the latter to pivot about its axis for the purpose of releasing the tooth from the first, second and third stop surfaces.

12. The device according to claim 11, wherein the blade possesses a pin to which a control rod is fastened.

13. The device according to claim 11, wherein the ring possesses a drill hole into which is engaged a boss projecting from a fixed flange.

14. The device according to claim 1, wherein the at least one stop surface comprises at least two stop surfaces, and the element that possesses the stepped quadrant is a board possessing a first convex surface, a second convex surface and a third stepped surface which are delimited relative to one another by the two stop surfaces.

15. The device according to claim 14, wherein the pawl possesses a tab capable of sliding on the convex surface.

16. The device according to claim 14, wherein a moveable flange is prolonged by a horn coming to bear against a stop in a rearwardly inclined position of the back.

* * * * *